(12) United States Patent
Yoo

(10) Patent No.: US 7,971,213 B2
(45) Date of Patent: Jun. 28, 2011

(54) SPINDLE MOTOR WITH STABILITY AND VIBRATION REDUCTION MECHANISM

(75) Inventor: Jin Seung Yoo, Gwangju (KR)

(73) Assignee: LG Innotek Co. Ltd., Seoul (KR)

( * ) Notice: Subject to any disclaimer, the term of this patent is extended or adjusted under 35 U.S.C. 154(b) by 0 days.

(21) Appl. No.: 12/537,879

(22) Filed: Aug. 7, 2009

(65) Prior Publication Data

US 2009/0307717 A1 Dec. 10, 2009

Related U.S. Application Data

(60) Continuation of application No. 11/832,313, filed on Aug. 1, 2007, now Pat. No. 7,757,245, which is a division of application No. 10/859,155, filed on Jun. 3, 2004, now Pat. No. 7,461,391, which is a continuation of application No. PCT/KR2002/002202, filed on Nov. 23, 2002.

(30) Foreign Application Priority Data

Dec. 13, 2001 (KR) .......................... 10-2001-0078831

(51) Int. Cl.
*G11B 17/03* (2006.01)
*G11B 19/20* (2006.01)
*G11B 17/028* (2006.01)
(52) U.S. Cl. ........................................ 720/702; 720/705
(58) Field of Classification Search .................. 720/398, 720/701–705, 698

See application file for complete search history.

(56) References Cited

U.S. PATENT DOCUMENTS

| | | | |
|---|---|---|---|
| 5,460,017 A * | 10/1995 | Taylor | 68/23.2 |
| 5,857,360 A | 1/1999 | Kim et al. | |
| 5,857,361 A | 1/1999 | Jang | |
| 6,082,151 A | 7/2000 | Wierzba et al. | |
| 6,132,354 A | 10/2000 | Ohtsu et al. | |
| 6,198,715 B1 | 3/2001 | Kouno et al. | |
| 6,205,110 B1 | 3/2001 | Miyamoto et al. | |
| 6,333,912 B1 | 12/2001 | Sohn | |
| 6,442,782 B1 | 9/2002 | Vande Haar | |
| 6,477,133 B1 | 11/2002 | Yoshimura et al. | |
| 6,535,475 B1 * | 3/2003 | Sohn et al. | 369/264 |
| 6,741,544 B1 | 5/2004 | Naka et al. | |
| 2001/0000312 A1 * | 4/2001 | Kume et al. | 369/263 |
| 2002/0056338 A1 | 5/2002 | Olausson et al. | |
| 2004/0268376 A1 | 12/2004 | Yoo et al. | |
| 2005/0223400 A1 * | 10/2005 | Matsushita et al. | 720/702 |

FOREIGN PATENT DOCUMENTS

JP 11096661 A 4/1999

(Continued)

*Primary Examiner* — Craig A. Renner
*Assistant Examiner* — Adam B Dravininkas
(74) *Attorney, Agent, or Firm* — Edell, Shapiro & Finnan, LLC (57) ABSTRACT

Disclosed is a spindle motor comprising: an integral turntable including: a table on which a rotating body to be installed, and an inner side wall and an outer side wall formed to be recessed upwards at a portion therebetween on a lower surface of the table so that a predetermined hollow is formed, a surface of thereof being formed slant; a ball cover for covering a ball inserted into the hollow and the hollow; a rotation shaft an upper portion of which is inserted into a center of the integral turntable; a bearing supporting a lower portion of the rotation shaft; a coil formed on an outside of the rotation shaft; and a magnet formed on an outside of the coil.

18 Claims, 4 Drawing Sheets

| | FOREIGN PATENT DOCUMENTS | | |
|---|---|---|---|
| JP | 2001101779 A | | 4/2001 |
| JP | 2002333053 A | * | 11/2002 |
| KR | 1999018765 | | 3/1999 |
| KR | 199961814 | | 7/1999 |
| WO | 9916070 | | 4/1999 |
| WO | 2007039846 A2 | | 4/2007 |

* cited by examiner

SPINDLE MOTOR WITH STABILITY AND VIBRATION REDUCTION MECHANISM

CROSS REFERENCE TO RELATED APPLICATIONS

This application is a continuation of pending U.S. application Ser. No. 11/832,313, which is a divisional of U.S. application Ser. No. 10/859,155 (now U.S. Pat. No. 7,461,391), which is a continuation of PCTKR2002002202, the entire contents of each of which are hereby incorporated by reference.

FIELD OF THE INVENTION

The present invention relates to a spindle motor, and more particularly, to a spindle motor having a ball and a ball casing to reduce vibration and achieve optimal stable revolution. In particular, the invention is directed to a spindle motor in which a friction surface enabling the ball to be subject to a proper frictional force is achieved.

BACKGROUND

In a general spindle motor, rotation shaft is forcedly inserted in T-bush, and the T-bush is coupled with clamp plate, turntable and ball case storing balls. In other words, the T-bush, the clamp plate, the turntable and the ball case are fabricated separately. As a result, the clamp plate is coupled with the upper surface of the T-bush. The turntable and the ball case are coupled with an outer cylindrical surface of the T-bush. The T-bush is forcedly inserted into the rotation shaft. So, the conventional spindle motor as described above is fabricated very complicatedly. Fabrication cost also rises due to the complicated fabrication. To overcome the problem as described above, there was proposed a spindle motor consisting of a T-bush, a clamp plate, a turntable and a ball casing.

Figure 1:
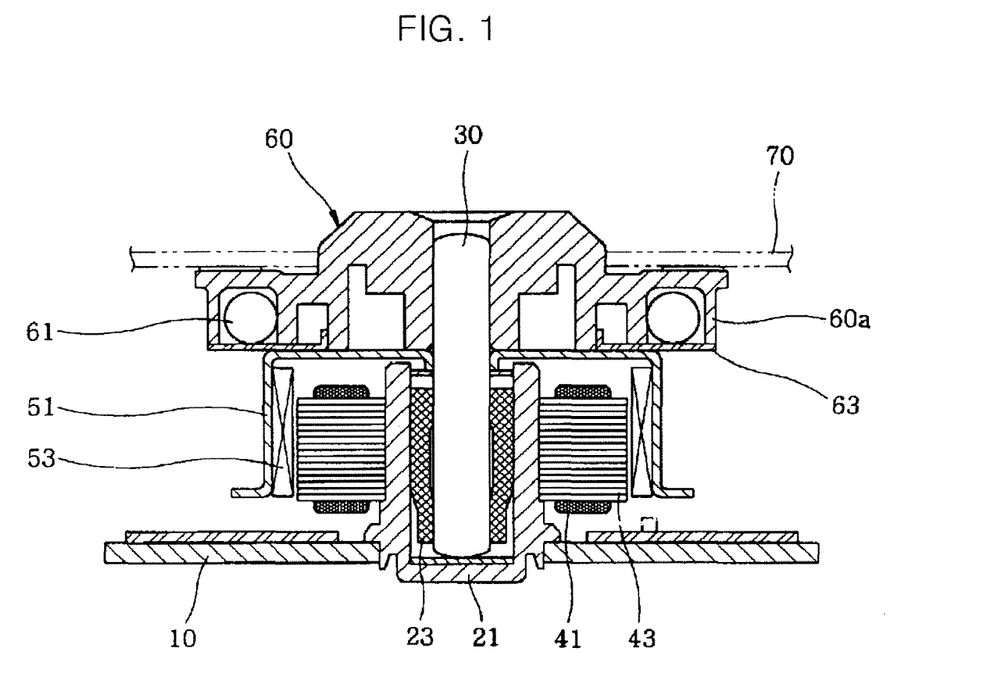
FIG. 1 is a cross sectional view of a spindle motor having one body turntable.

FIG. 1 is a cross sectional view of a spindle motor having an integral turntable. Referring to FIG. 1, a bearing housing 21 is installed on a plate 10 and a bearing 23 supporting a rotation shaft 30 is forcedly inserted in an inner cylindrical surface of the bearing housing 21. A core 41 is coupled with an outer cylinder of the bearing housing 21. A coil 43 is wound on the core 41. A rotor yoke 51 surrounding the core 41 is installed at the almost center of the rotation shaft 30. A magnet 53 opposed to the core 41 is installed on an inner cylindrical surface of the rotor yoke 51. An integral turntable 60 is coupled with an upper portion of the rotation shaft 30. A disk 70 is mounted on an upper surface of the integral turntable 60. A ball 61 and a ball cover 63 are installed in the integral turntable 60 to reduce vibration caused by eccentricity of a rotating body. Balancing operation of the ball 61 will be described schematically.

When a spindle motor is rotated, a rotating body is vibrated due to the integral turntable 60 as itself and the eccentricity of the disk 70 installed on the turntable 60. Here, when the revolution per second of the motor exceeds the resonance frequency of a set, the ball 61 contacted to the inner cylindrical surface of an outer wall 60a of the turntable 60 moves to the opposite direction of eccentricity and stops at the location at which the eccentricity of the rotating body is compensated owing to centrifugal force caused by rotation of the rotating body and frictional force at a contact surface of the balls so that vibration is reduced.

Since centrifugal force depends on the revolution of the rotating body, vibration reduction of the spindle motor is controlled according to the frictional force of the contacted frictional surface between the balls. In other words, if a frictional force is weak, vibration reduction is excellent and stabilization revolution of a spindle motor is achieved at a high revolution. On the contrary, if a frictional force is strong, vibration reduction is reduced and stabilization revolution of a spindle motor is achieved at a low revolution.

On the other hand, it is not desired that the balls 61 move continuously even in normal operation state of the spindle motor since if a frictional force of the contact surface between the balls 61 is weak, the stabilization revolution gets high. For example, in the case of an audio compact disk, the spindle motor should operate at 3,700 rpm in a normal state. However, if a friction force is weak and a stabilization revolution approaches to or exceeds 3,700 rpm, the spindle motor does not operate stably since the balls fluctuate.

For this problem, the roughness is enhanced in the related art in order to enhance the frictional force. However, in case that a T-bush, a clamp plate, a turntable and a ball contacting surface are integrated as an integral turntable, an inner cylindrical surface of an outer wall 60a as a contacting surface of ball 61 is difficult to form to have a proper roughness in its manufacturing procedure. Even though it has a proper roughness, it is practically difficult to make a satisfactorily reliable roughness in its manufacturing procedure to obtain a proper stable revolution. Even if all products are produced in the same condition, the products are different from each other in their roughness. Accordingly, since their stabilization revolutions are possibly set to be differently, it is very difficult to adjust frictional force by making roughness in manufacturing spindle motors employing integral turntables.

SUMMARY

Accordingly, the present invention is directed to a spindle motor that substantially obviates one or more of the problems due to limitations and disadvantages of the related art.

An object of the present invention is to provide a spindle motor to obtain both of vibration reduction capability and stabilization revolution by forming the surface contacting balls slant with respect to centrifugal force in order to increase frictional force of a ball's frictional surface contacting another ball.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, there is provided a spindle motor including: a bearing housing having an inner cylindrical surface of which a bearing is forcedly inserted into; a rotation shaft having an upper portion of which is exposed to an upper portion of the bearing housing and a lower portion of which is supported by the bearing; a core installed on an outer side of the bearing housing and wound by a coil; a rotor yoke surrounding the core and coupled with a vertical center portion of the rotor axis; a magnet adhered to an inner cylindrical surface of the rotor yoke to be opposed to the core; and an integral turntable including: a forcibly inserting unit inserted forcibly into the upper portion of the rotation shaft, a table unit extending to the outer side of the forcibly inserting unit and allowing a rotating body to be installed thereon, an inner side wall and an outer side wall extending downwards perpendicular to a direction of a centrifugal force of the table unit at a lower surface of the table unit and spaced from each other to allow a ball to be inserted therebetween, and a ball cover coupled with the lower surface of the inner side wall and the outer side wall, an inner cylindrical surface of the outer side wall being slant as it travels downwards.

In another aspect of the present invention, a spindle motor includes: an integral turntable including: a table on which a rotating body to be installed, and an inner side wall and an outer side wall formed to be recessed upwards at a portion therebetween on a lower surface of the table so that a predetermined hollow is formed, a surface of thereof being formed slant; a ball cover for covering a ball inserted into the hollow; a rotation shaft having an upper portion of which is inserted into a center of the integral turntable; a bearing supporting a lower portion of the rotation shaft; a coil formed on an outside of the rotation shaft; and a magnet formed on an outside of the coil.

As the present invention, the frictional surface of a ball is formed so that the manufacturing steps are simplified and further the reliability of products is enhanced. It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION

Reference will now be made in detail to the spindle motor according to the preferred embodiments of the present invention, examples of which are illustrated in the accompanying drawings.

Figure 2:
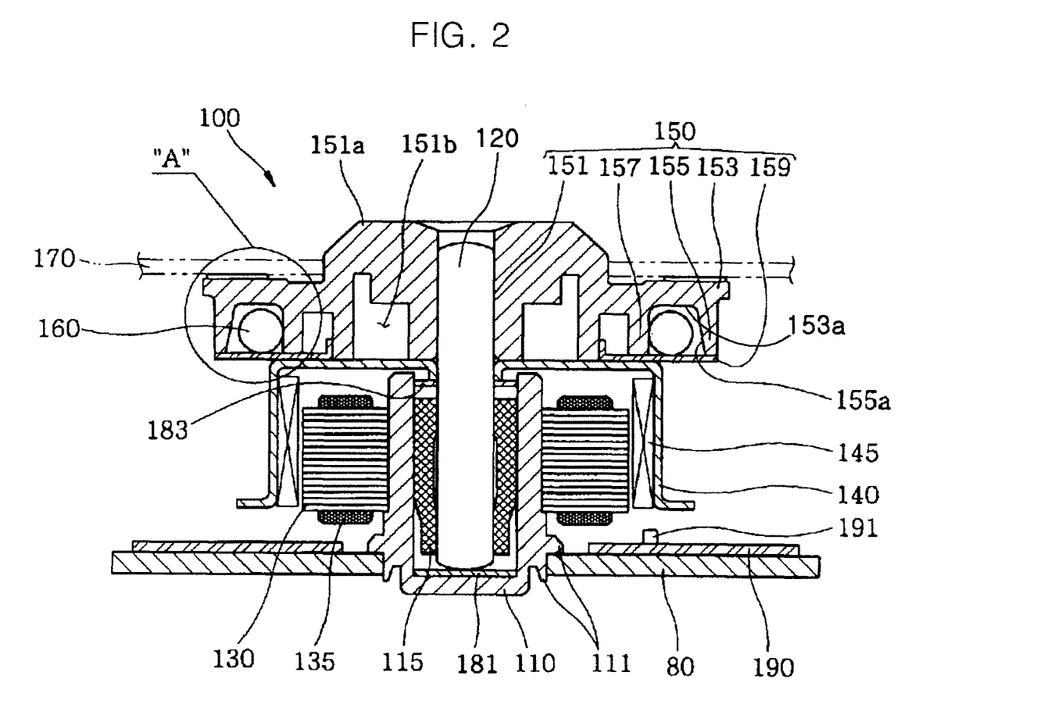
FIG. 2 is a cross-sectional view of a spindle motor according to the first embodiment of the present invention.

FIG. 2 is a cross-sectional view of a spindle motor according to the first embodiment of the present invention.

Referring to FIG. 2, a spindle motor 100 comprises a bearing housing 110 which has an opening on an upper surface, a plate 80 coupled with a lower portion of the bearing housing 110, and a bearing 115 forcibly inserted into a contracting surface of the bearing housing 110 and a rotation shaft 120. A cogging unit 111 is installed on an outer cylindrical surface of the lower portion of the bearing housing 110 to fix the bearing housing 110 to the plate 80. A bearing 115 supports the lower portion of the rotation shaft 120 and the upper portion of the rotation shaft 120 is exposed to the upper portion of the bearing housing 110. A core 135 wound by a coil 130 is coupled with an outer cylindrical surface of the bearing housing 110. A rotor yoke 140 having a lower surface of which is opened is coupled with a center portion of a rotation shaft 120. The rotor yoke 140 is installed to surround the core 135. A magnet 145 opposed to the core 135 is further installed on an inner cylindrical surface of the rotor yoke 140. An integral turntable 150 is forcibly inserted into an upper portion of the rotation shaft 120.

In detail, an integral turntable includes a forcibly inserting unit 151 inserted forcibly into the rotation shaft 120 and in a plate shape, a table 153 extending to the outer side of the outer cylinder of the forcibly inserting unit 151 and in a plate shape, an outer side wall 155 and an inner side 157 wall recessed upward at a lower surface 153a of the table 153 and in a ring shape, and a ball cover 159 coupled with the lower surface of the outer side wall 155 and the inner side wall 157. A clamp (not shown in FIG. 2) is contacted going up and down on an upper surface of the forcibly inserting unit 151. A disk 170 is further installed on an upper surface of the table 153. The clamp is contacted with the upper surface 151a of the forcibly inserting unit 151 and the disk 170 to prevent the disk from shifting. The center portion of the forcibly inserting unit 151 is formed to be a hollow portion in order to minimize the weight of the integral turntable 150.

On the other hand, the outer side wall 155 extends from the lower surface of a peripheral side of the table 153 to an upper side of the table 153. The inner side wall 157 is spaced from the outer side wall 155 with a predetermined distance and recessed upwards at the lower surface of the table 153. Here, the inner side wall 157 is formed perpendicular to a direction of a centrifugal force. A ball cover 159 is coupled with the lower surface of the outer side wall 155 and the inner side wall 157 to form a predetermined space for a ball 160 between the outer side wall 155 and the inner side wall 157. The ball 160 to reduce vibration is placed at the space formed by the outer side wall 155, the inner side wall 157 and the ball cover 159. The references 181, 183, 190 and 191 not described depict a support plate, a washer, a circuit board and a sensor, respectively.

Specifically, in the spindle motor 100 according to the present invention, the inner cylindrical surface 155a of the outer side wall 155 is slant so as to increase a frictional force of the ball 160 and the integral turntable 150. More detailed describing, the inner cylindrical surface 155a of the outer side wall 155 is slant outwards as it travels downwards. The inclination of the outer side wall 155 and the inner side wall 157 will be described separately and the description will be the same.

Figure 3:
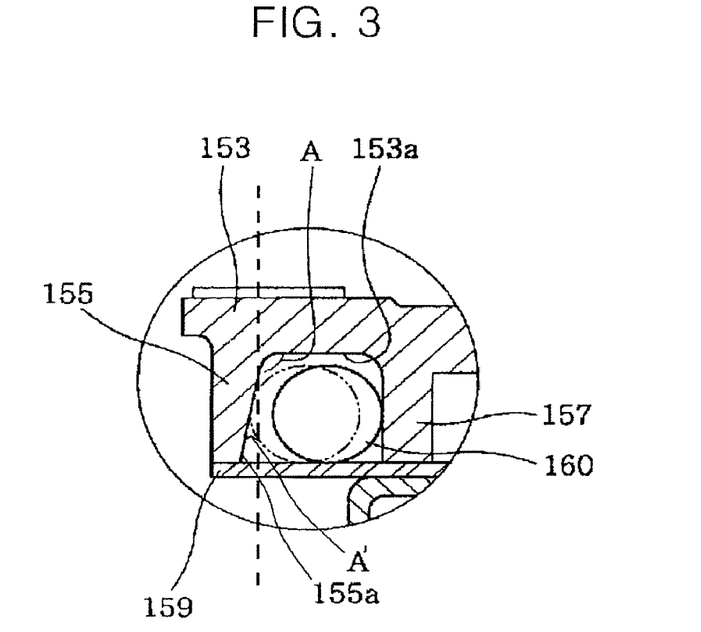
FIG. 3 is a magnified view of "A" of FIG. 2.

FIG. 3 is a magnified view of "A" of FIG. 2. Referring to FIG. 3, when a current is applied to the coil 130, the rotor yoke 140 is rotated by the interaction of the core 135 and the magnet 145. Similarly, the rotation shaft coupled with the rotor yoke 140 and the integral turntable 150 are also rotated. Here, the ball 160 is moved in the direction to contact the inner cylindrical surface 155a of the outer side wall 155 by a centrifugal force as depicted by dotted line in FIG. 3. When the revolution of the spindle motor 100 exceeds a resonance frequency of a rotating body, the ball 160 contacted with the inner cylindrical surface 155a of the outer side wall 155 is moved in the direction opposite to that of the eccentricity of the rotating body and reduces a vibration of the rotating body so as to suppress vibration caused by the eccentricity of the integral turntable and the disk 170 mounted on the integral turntable.

On the other hand, in the moving of the ball 160, since the inner cylindrical surface 155a of the outer side wall 155 is slant outwards as it travels downwards, the ball 160 is contacted with the ball cover 159 as well as the inner cylindrical surface 155a of the outer side wall 155 due to the force of the ball 160 going down along with the inner cylindrical surface 155a of the outer side wall 155 so that two strong frictional forces are generated. Therefore, since the frictional force increases more properly compared to the case of an outer side 155 of vertical shape in the related art, the vibration reduction capability may be decreased but the stabilization revolution can be reduced. As a result, a proper frictional force can be generated according to a rotation state and concrete application conditions of a rotating body.

It is desired that the angle A between the inner cylindrical surface 155a of the outer side wall and a lower surface of the table 153 according to the first embodiment of the present invention is made to be 93 to 110 degrees when a general optical disk is employed. In other words, the inner cylindrical surface 155a of the outer side wall 155 is slant from a virtual vertical line perpendicular to the lower surface of the table by 3 to 20 degrees A'. This value is suggested by a number of experiments and the choice of this value is not the simple choice of a value. However, in case that the application of the spindle motors is changed or the weight of the ball of the spindle motor is changed, different value can be suggested. Due to such a way mentioned above, even when an integral turntable is employed, the stabilization revolution of the spindle motor is can be controlled conveniently. In addition, the reliability of products is further enhanced in comparison with the way of controlling the roughness of the frictional surface contacting a ball in the related art, by applying a proper frictional force in two directions such as a frictional force on the ball and the number of a frictional surface contacting the ball. According to the experiments, in comparison with the way of enhancing the roughness in the related art, a process capability index Cpk is enhanced from 0.71 to 1.57 in vibration and from 2.86 to 3.74 in revolution.

Second Embodiment

Figure 4:
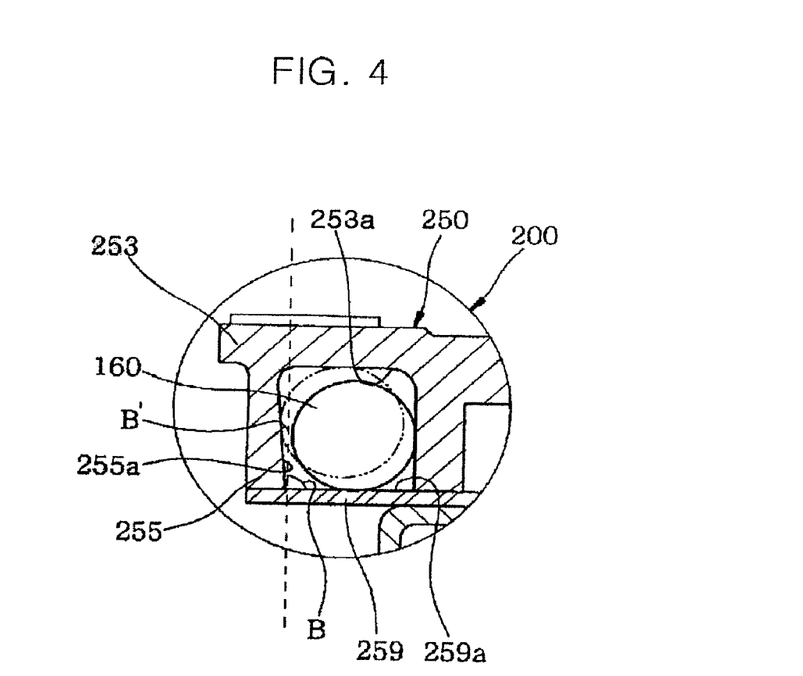
FIG. 4 is a cross-sectional view of main portion of a spindle motor according to the second embodiment of the present invention.

FIG. 4 is a cross-sectional view of main portion of a spindle motor according to the second embodiment of the present invention. Simply the difference from the first embodiment will be described. The spindle motor according to the second embodiment has an inner cylindrical surface 255a of the outer side wall 255 of the integral turntable 250 that is slant inwards as it travels downwards. In this case, when a spindle motor 200 is operated, a frictional force is increased since a ball 160 is contacted with the inner cylindrical surface 255a of the outer side wall 255 and an inner cylindrical surface 253a of the table 253. In other words, due to the operation of the spindle motor 200, the position of the ball 160 depicted by a solid line is shifted to the position depicted by a dotted line. Due to such a moving of the ball 160, the ball is moved upwards along with the inner cylindrical surface 255a of the outer side wall 255 and contacted with the lower surface 253a of the table 253 as well as the inner cylindrical surface 255a of the outer side wall 255 with a strong force. The angle B between the inner cylindrical surface 255a of the outer side wall 255 according to the second embodiment of the present invention and a ball cover 259 is made to be 93 to 110 degrees. In other words, the angle B' between the inner cylindrical surface 255a of the outer side wall 255 and a virtual vertical line perpendicular to the upper surface of the ball cover 259 is made to be 3 to 20 degrees.

Third Embodiment

Figure 5:
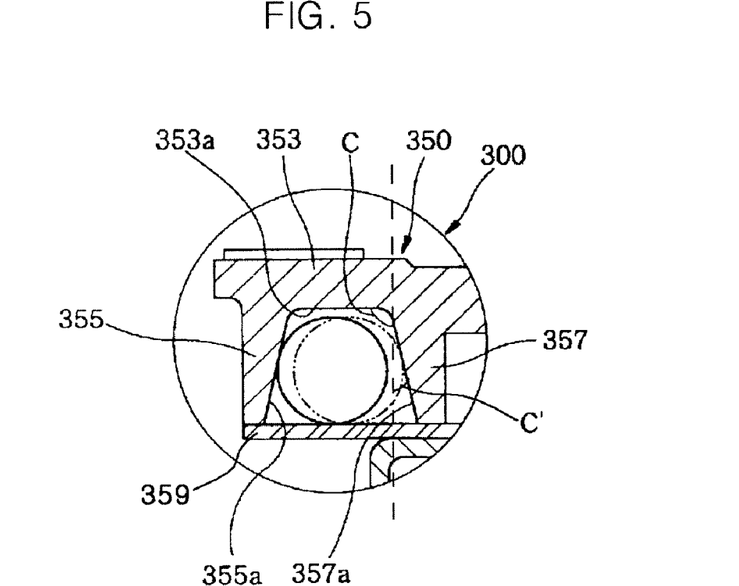
FIG. 5 is a cross-sectional view of main portion of a spindle motor according to the third embodiment of the present invention.

FIG. 5 is a cross-sectional view of main portion of a spindle motor according to the third embodiment of the present invention. Simply the difference from the first embodiment will be described. The spindle motor 300 according to the third embodiment has an inner cylindrical surface 355a of the outer side wall 355 of the integral turntable 350 that is slant outwards as it travels downwards and an inner cylindrical surface 355a of the outer side wall 355 and an inner cylindrical surface 357a of the inner side wall 357 that is slant inwards as it travels downwards. On the other hand, this embodiment of the present invention can be applied desirably when a spindle motor is made vertically and operated. The operation of this embodiment will be described. When the spindle motor 300 is operated, the force is generated to fell the ball 160 to the inner side wall 357 due to attraction of gravity because of a forming direction of the spindle motor 300 as well as the force that pushes the ball 160 to the outer side wall 355 caused by centrifugal force. Here, as depicted by a dotted line in FIG. 5, the ball 160 can be contacted with the ball cover 359 on the side of the inner cylindrical surface 357a of the inner side wall 357 due to attraction of gravity as well as with the inner cylindrical surface 355a of the outer side wall 355. Here, the inner side wall 357 is formed to be slant and the ball is contacted with inner cylindrical surface 357a of the inner side wall and also the ball cover 359 so that the stabilization revolution can be controlled by increasing the frictional force. The angle C between the inner cylindrical surface of the inner side wall 357 according to the third embodiment of the present invention and a lower surface of the table 353 is made to be 93 to 110 degrees. In other words, the angle C' between the inner cylindrical surface 357a of the inner side wall 357 and a virtual vertical line perpendicular to the lower surface of the turntable is made to be 3 to 20 degrees.

Fourth Embodiment

Figure 6:
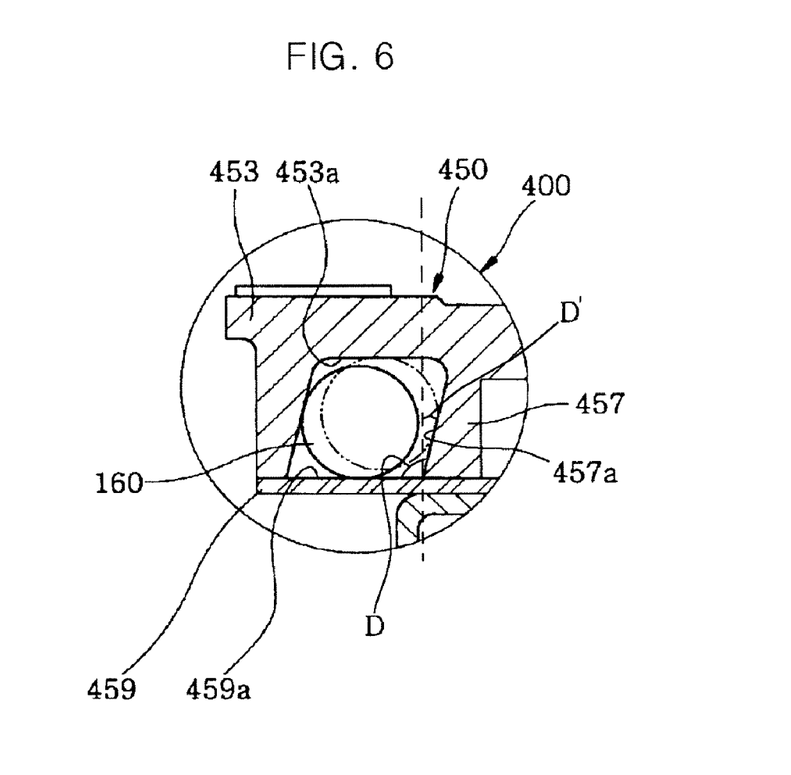
FIG. 6 is a cross-sectional view of main portion of a spindle motor according to the fourth embodiment of the present invention.

FIG. 6 is a cross-sectional view of main portion of a spindle motor according to the fourth embodiment of the present invention. Simply the difference from the first embodiment will be described since many portions are similar to those of the first embodiment. In the present embodiment, the spindle motor is formed vertically so that this embodiment is applied when attraction of gravity affects on the ball 160 moving. The spindle motor 400 has an inner cylindrical surface 457a of the inner side wall 457 of the integral turntable 450 that is slant outwards as it travels downwards. In the present embodiment, when a ball 160 is moved downwards by attraction of gravity, the ball 160 is contacted with the inner cylindrical surface 457a of the outer side wall 457 and the lower surface 453a of the table 453. In other words, the ball 160 is moved upwards along with the inner cylindrical surface 457a of the outer side wall 457. Owing to such a structure, the contacting surfaces of the ball 160 or two frictional surfaces are formed so that the frictional force of the contacting surfaces of balls can be controlled. The angle D between the inner cylindrical surface 457a of the inner side wall 457 according to the fourth embodiment of the present invention and a upper surface of the ball cover 459 is made to be 93 to 110 degrees. In other words, the angle D' between the inner cylindrical surface 457a of the inner side wall 457 and a virtual vertical line perpendicular to the upper surface of the ball cover 459 is made to be 3 to 20 degrees.

The inner cylindrical surfaces 355a and 455a of the outer side walls 355 and 455 of the integral turntables 350 and 450 according to the third and fourth embodiment is formed to be slant inwards as they travel downwards as those of the first embodiment so that the frictional force is increased.

The embodiment as described above provides the method of controlling a frictional force by forming racer surface contacted with one side and/or both sides of a ball to be slant. The people skilled in the art can easily suggest the other embodiments besides the embodiment suggested above.

INDUSTRIAL APPLICABILITY

As described above, the spindle motor according to the present invention has increased frictional force since a ball is strongly contacted with many portions of the integral turntable, especially, contacting surface with which balls are contacted with each other. Therefore, the spindle motor of the present invention satisfies properly both of the desired vibration reduction capability and the desired stabilization revolution in comparison with the spindle motors in the related art.

Specifically, it can more easily generate the frictional force to stop a ball even at the revolution proper to rotation of an optical disk. And also, the spindle motor of the present invention employs an integral turntable and can easily control the frictional force of the balls. Specifically, in the present invention, the reliability of revolution reduction and stabilization revolution is further improved in comparison with the conventional method of controlling the roughness so that all the products produced by one manufacturing procedure have the same performance reliably.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A turntable coupled with a motor, the turntable comprising:
   a table having an upper surface and a lower surface, wherein a disk is mountable on the upper surface of the table;
   an inner side wall, an upper wall, and an outer side wall forming an annular hollow portion at the lower surface of the table, wherein all portions of a surface of the outer side wall slant outward away from a center axis of the turntable as the outer side wall travels downward toward the lower surface of the table and all portions of a surface of the inner side wall slant outward away from the center axis of the turntable as the inner side wall travels downward toward the lower surface of the table;
   a ball inserted into the annular hollow portion; and
   a ball cover covering an opening of the annular hollow portion at the lower surface of the table.

2. The turntable according to claim 1, wherein the inner side wall and the outer side wall slant in substantially the same direction.

3. The turntable according to claim 1, wherein an upper surface of the ball cover faces the upper wall and the upper surface of the ball cover is flat.

4. A turntable coupled with a motor, the turntable comprising:
   a table having an upper surface and a lower surface, wherein a disk is mountable on the upper surface of the table;
   an inner side wall, an upper wall, and an outer side wall forming an annular hollow portion at the lower surface of the table, wherein all portions of a surface of the outer side wall slant outward from a center axis of the turntable as the surface of the outer side wall travels downward toward the lower surface of the table, and wherein all portions of a surface of the inner side wall slant outward from the center axis of the turntable as the surface of the inner side wall travels downward toward the lower surface of the table;
   a ball inserted into the annular hollow portion; and
   a ball cover covering an opening of the annular hollow portion at the lower surface of the table.

5. A spindle motor, comprising:
   a bearing housing having a bearing inserted therein;
   a shaft rotatably supported by the bearing;
   a stator disposed around the bearing housing;
   a rotor facing the stator, the rotor being configured to rotate with the shaft; and
   a turntable coupled to a portion of the shaft exposed from the bearing housing, the turntable including:
      a table having an upper surface and a lower surface, wherein a disk is mountable on the upper surface of the table;
      an inner side wall, an upper wall, and an outer side wall forming an annular hollow portion at a lower surface of the table, wherein the inner side wall and the outer side wall slant inward toward a center axis of the turntable, the inner side wall and the outer side wall slanting in substantially the same direction;
      a ball inserted into the annular hollow portion; and
      a ball cover covering an opening of the annular hollow portion at the lower surface of the table.

6. The spindle motor according to claim 5, wherein the stator comprises a stator core having coil wound therein, and wherein the rotor comprises a rotor yoke having a magnet installed therein.

7. The spindle motor according to claim 5, wherein an upper surface of the ball cover faces the upper wall, and wherein the upper surface of the ball cover is flat.

8. A spindle motor, comprising:
   a bearing housing having a bearing inserted therein;
   a shaft rotatably supported by the bearing;
   a stator disposed around the bearing housing;
   a rotor facing the stator, the rotor being configured to rotate with the shaft; and
   a turntable coupled to a portion of the shaft exposed from the bearing housing, the turntable including:
      a table having an upper surface and a lower surface, wherein a disk is mountable on the upper surface of the table;
      an inner side wall, an upper wall, and an outer side wall forming an annular hollow portion at a lower surface of the table, wherein all portions of a surface of the outer side wall slant outward from a center axis of the turntable as the outer side wall travels downward toward the lower surface of the table and all surfaces of the inner side wall slant outward from the center axis of the turntable as the inner side wall travels downward toward the lower surface of the table;
   a ball inserted into the annular hollow portion; and
   a ball cover covering an opening of the annular hollow portion at the lower surface of the table.

9. A spindle motor, comprising:
   a bearing housing having a bearing inserted therein;
   a shaft rotatably supported by the bearing;
   a stator disposed around the bearing housing;
   a rotor facing the stator, the rotor being configured to rotate with the shaft; and a turntable coupled to a portion of the shaft exposed from the bearing housing, the turntable including:
  a table having an upper surface and a lower surface, wherein a disk is mountable on the upper surface of the table;
  an inner side wall, an upper wall, and an outer side wall forming an annular hollow portion at a lower surface of the table, wherein the inner side wall and the outer side wall slant inward toward a center axis of the turntable, the inner side wall and the outer side wall slanting in substantially the same direction; and
  a ball inserted into the annular hollow portion,
wherein a portion of the rotor is disposed under the annular hollow portion.

10. The spindle motor according to claim 9, wherein the stator comprises a stator core having coil wound therein, and wherein the rotor comprises a rotor yoke having a magnet installed therein.

11. A spindle motor, comprising:
a bearing housing having a bearing inserted therein;
a shaft rotatably supported by the bearing;
a stator disposed around the bearing housing;
a rotor facing the stator, the rotor being configured to rotate with the shaft; and
a turntable coupled to a portion of the shaft exposed from the bearing housing, the turntable including:
  a table having an upper surface and a lower surface, wherein a disk is mountable on the upper surface of the table;
  an inner side wall, an upper wall, and an outer side wall forming an annular hollow portion at a lower surface of the table, wherein all portions of a surface of the outer side wall slant outward from a center axis of the turntable as the outer side wall travels downward toward the lower surface of the table, and all surfaces of the inner side wall slant outward from the center axis of the turntable as the inner side wall travels downward toward the lower surface of the table; and
  a ball inserted into the annular hollow portion, wherein a portion of the rotor is disposed under the annular hollow portion.

12. A spindle motor, comprising:
a bearing housing having a bearing inserted therein;
a shaft rotatably supported by the bearing;
a stator disposed around the bearing housing;
a rotor facing the stator, the rotor being configured to rotate with the shaft; and
a turntable coupled to a portion of the shaft exposed from the bearing housing, the turntable including:
  a table having an upper surface and a lower surface, wherein a disk is mountable on the upper surface of the table;
  a first inner side wall, a first upper wall, and a first outer side wall forming a first annular hollow portion at a lower surface of the table, all portions of a surface of the first outer side wall slanting as the first outer side wall travels downward toward the lower surface of the table, and all portions of a surface of the first inner side wall slanting as the first inner side wall travels downward toward the lower surface of the table;
  a second upper wall and a second side wall including a second inner side wall and a second outer side wall forming a second annular hollow portion at a lower surface of the table, wherein the second annular hollow portion is closer to the shaft than the first annular hollow portion;
  a ball inserted into the first annular hollow portion; and
  a ball cover covering an opening of the first annular hollow portion at the lower surface of the table, wherein a portion of the ball cover is bent and inserted into the second annular hollow portion and contacts the second side wall of the second hollow portion.

13. The spindle motor according to claim 12, wherein the first annular hollow portion is deeper than the second annular hollow portion.

14. The spindle motor according to claim 12, wherein a height of a portion of the table between the first annular hollow portion and the second annular hollow portion is higher than a height of the lowermost surface of the table.

15. The spindle motor according to claim 12, wherein the stator comprises a stator core having coil wound therein, and wherein the rotor comprises a rotor yoke having a magnet installed therein.

16. The spindle motor according to claim 12, wherein the turntable includes a third annular hollow portion at a lower surface of the table, and
wherein the third annular hollow portion is closer to the shaft than the second annular hollow portion.

17. A spindle motor, comprising:
a bearing housing having a bearing inserted therein;
a shaft rotatably supported by the bearing;
a stator disposed around the bearing housing;
a rotor facing the stator, the rotor being configured to rotate with the shaft; and
a turntable coupled to a portion of the shaft exposed from the bearing housing, the turntable including:
  a table having an upper surface and a lower surface, wherein a disk is mountable on the upper surface of the table;
  a first inner side wall, a first upper wall, and a first outer side wall forming a first annular hollow portion at a lower surface of the table;
  a second upper wall and a second side wall including a second inner side wall and a second outer side wall forming a second annular hollow portion at a lower surface of the table, wherein the second annular hollow portion is closer to the shaft than the first annular hollow portion;
  a ball inserted into the first annular hollow portion; and
  a ball cover covering an opening of the first annular hollow portion at the lower surface of the table,
  wherein a portion of the table between the first annular hollow portion and the second annular hollow portion thickens as the portion travels downward toward the lower surface of the table.

18. The spindle motor according to claim 12, wherein a portion of the table between the first annular hollow portion and the second annular hollow portion thickens as it travel downwards.

* * * * *